United States Patent [19]

Cross

[11] Patent Number: 5,615,097
[45] Date of Patent: Mar. 25, 1997

[54] TRANSIENT OVER VOLTAGE PROTECTION CIRCUIT FOR ELECTRICAL POWER CONVERTERS

[75] Inventor: David A. Cross, Wrestlingworth, United Kingdom

[73] Assignee: Astec International, Ltd., Hong Kong

[21] Appl. No.: 309,074

[22] Filed: Sep. 20, 1994

[51] Int. Cl.$^6$ .............................. H02M 5/42; H02H 3/22
[52] U.S. Cl. .............................................. 363/84; 361/111
[58] Field of Search .................................. 363/52, 53, 55, 363/56, 78, 84; 361/18, 86, 91, 111, 118

[56] References Cited

U.S. PATENT DOCUMENTS

| | | | |
|---|---|---|---|
| 4,065,803 | 12/1977 | Mikada et al. | 361/88 |
| 4,091,434 | 5/1978 | Suzuki et al. | 361/100 |
| 5,179,508 | 1/1993 | Lange et al. | 363/16 |

FOREIGN PATENT DOCUMENTS

| | | | |
|---|---|---|---|
| 0524425A1 | 1/1993 | European Pat. Off. | H02H 9/00 |
| 4031505A1 | 4/1992 | Germany | H02M 7/04 |
| 496622A | 3/1992 | Japan | H02H 9/04 |

Primary Examiner—Matthew V. Nguyen
Attorney, Agent, or Firm—Coudert Brothers

[57] ABSTRACT

A transient voltage protection circuit includes a normally closed switch connected between a rectifier circuit and a DC to DC converter. This switch is caused to switch to a current limit state when the voltage input to the DC to DC converter exceeds a first predetermined value, thereby protecting the DC to DC converter from voltages that exceed the converter's operational limits. The switch is returned to its normally closed state when the voltage input to the converter drops below a second predetermined lower value. A capacitor connected across the input terminals of the converter is charged up when the switch is closed and functions to supply power to the DC to DC converter when the switch is in its current limit state. The current limit state of the switch comprises the periodic switching of said switch between a normally closed state and an open state, said switch being caused to open when the voltage across said capacitor reaches said first predetermined value and to close when the voltage across the capacitor drops to said second predetermined lower value.

18 Claims, 3 Drawing Sheets

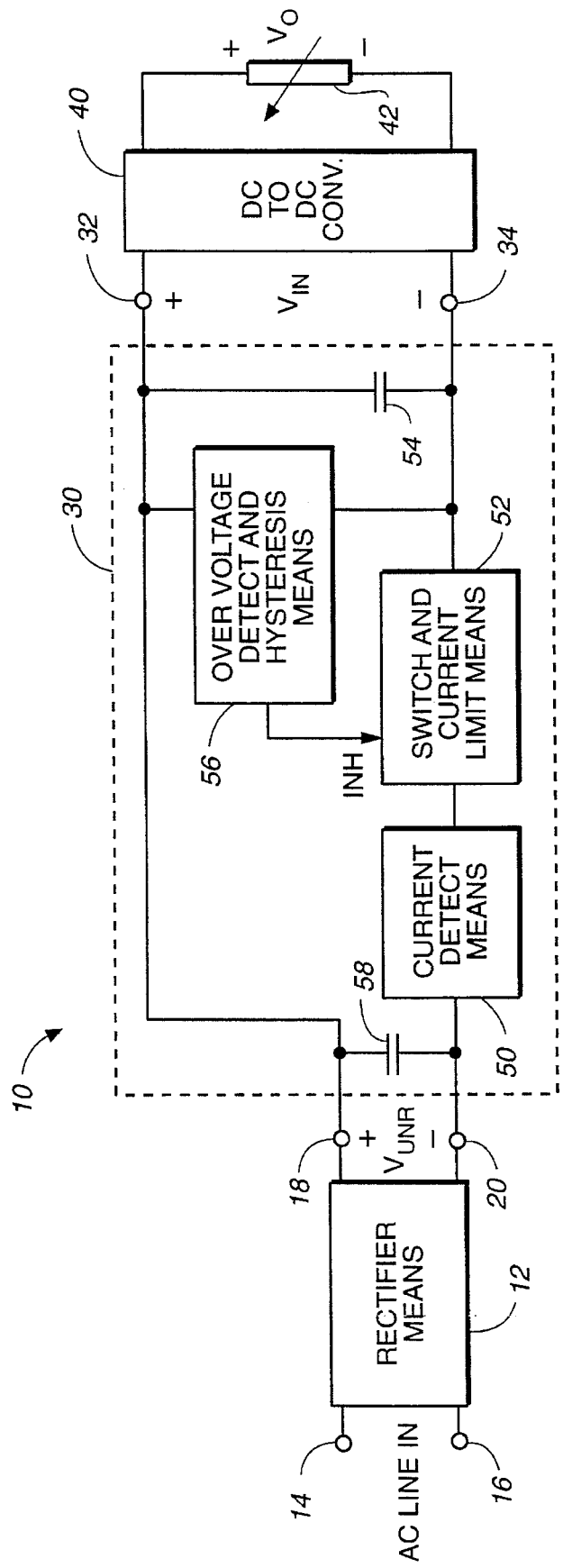
FIG._1

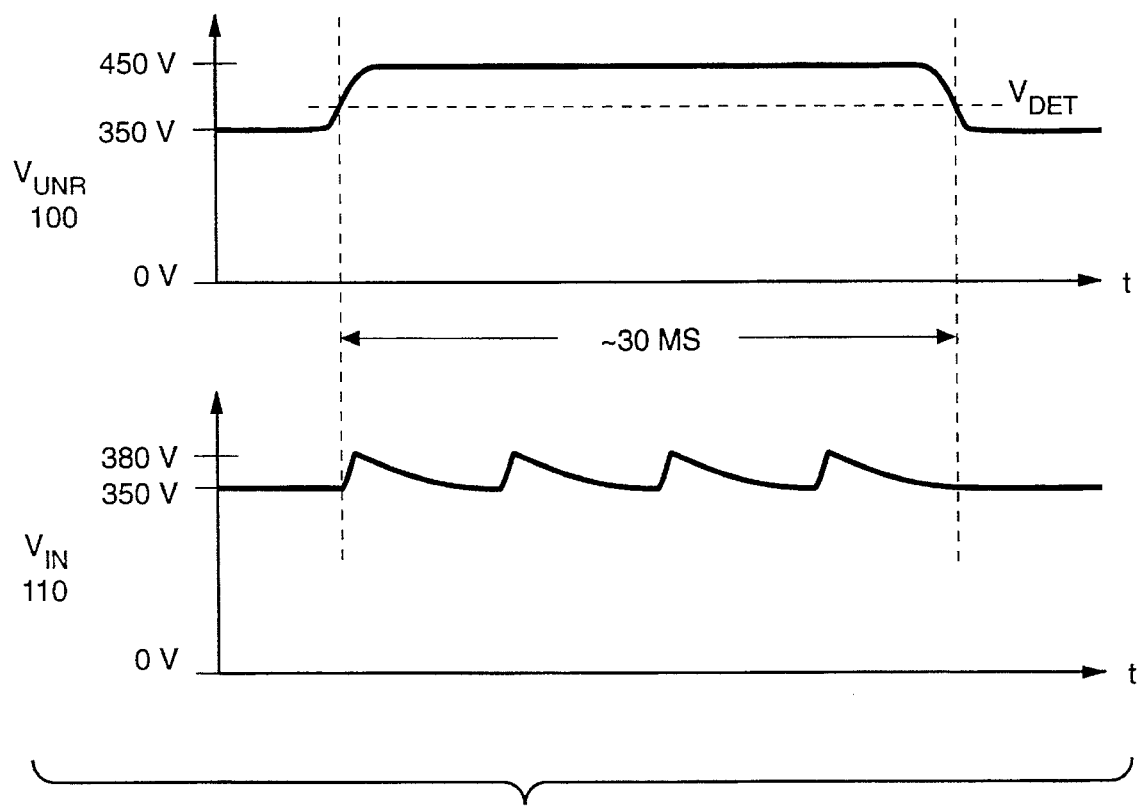
FIG._2

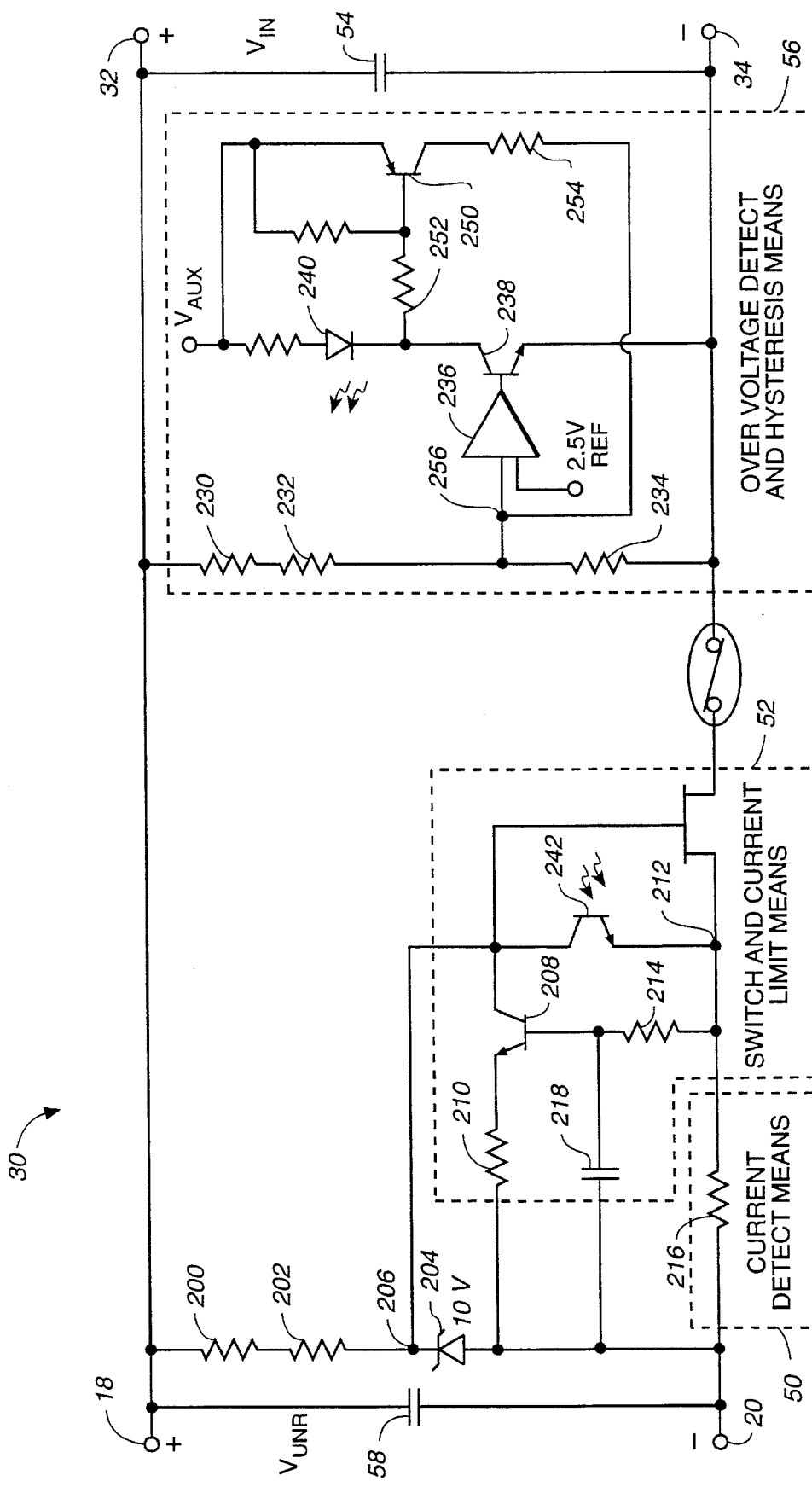
FIG._3

5,615,097

TRANSIENT OVER VOLTAGE PROTECTION CIRCUIT FOR ELECTRICAL POWER CONVERTERS

FIELD OF THE INVENTION

The present invention relates to electrical power converters, and more particularly to a circuit for enabling continuous power to be output from a power converter when an excessively high transient input voltage is coupled to the converter.

BACKGROUND OF THE INVENTION

Many electronic devices, such as computers and many household appliances, require one or more regulated DC voltages. The power for such electronic devices is ordinarily supplied by power converters that convert an AC line voltage into the regulated DC voltages required by the devices. A significant portion of the world uses an AC voltage standard of either 120 Vrms or 220 Vrms. A few areas set their voltage standard at 240 Vrms.

Electrical power converters commonly include a rectifier circuit which converts the AC line voltage to an unregulated DC voltage, also known as a rectified line voltage, and a DC-to-DC converter for convening this unregulated DC voltage into one or more regulated DC output voltages. The maximum nominal unregulated DC voltage generated by such a rectifier circuit will typically be 340 V to 385 V for a 240 Vrms AC voltage input.

Other power supplies use power factor correction circuitry instead of a simple rectifier circuit to raise the power factor of the unregulated DC voltage and eliminate harmonic distortion. Such circuits are often referred to as power factor correction ("PFC") circuits.

A difficulty with rectifier or PFC circuits is that they allow input transient voltages lasting tens of milliseconds and having an amplitude of 450 V or more to be produced. For example, a transient AC voltage of 317 Vrms lasting 20 ms may appear on the input AC line. The resultant rectified DC voltage that will be supplied to the DC-to-DC converter will be dangerously high, approximately 450 V DC. This voltage will typically be significantly above the maximum input voltage rating for the converter. In known prior art systems, in order to prevent such transients from damaging the converter, unsophisticated transient energy absorption devices are used to blow a fuse. The problem with such solutions is that, when the fuse blows, it renders the unit inoperable.

An alternative method for responding to the occurrence of a dangerous transient overvoltage condition in a system using a PFC circuit would be to disable the PFC circuit until the overvoltage condition has subsided. Typical PFC circuits have a disable pin that is accessible to a control circuit. Unfortunately, if such a disable pin were used, the PFC module is forced to go through a start up scenario that could take seconds, during which time the power system would have collapsed.

Accordingly, what is needed is some technique to allow operation of the converter to continue, not only after the high level DC transient voltage pulse has subsided, but also during the time the DC transient voltage is being produced by the rectifier circuit, without damage to the converter or any system components.

SUMMARY OF THE INVENTION

Broadly stated, the present invention comprises an overvoltage detection circuit that partially opens a normally closed switch connected between a rectifier circuit and a DC-to-DC converter before the voltage on the input terminals of the DC-to-DC converter exceeds the converter's operational limits, and thereafter enables the switch to return to its normally closed state when the level of voltage on the input terminals of the o converter drops below a predetermined lower voltage level. A capacitor connected across the input terminals of the converter is charged up when the switch is closed and functions to supply power to the converter when the switch is in this partially open or current limit state.

More specifically, in an electrical power converter having a rectifier means for converting an input AC voltage to an unregulated DC intermediate voltage, said intermediate voltage appearing on first and second output terminals of said rectifier means, and a DC-to-DC converter for converting said unregulated DC intermediate voltage into one or more regulated output DC voltages, including first and second input terminals, a transient voltage protection circuit according to the present invention comprises: a first switch connected in series between one of said first and second output terminals of said rectifier means and a corresponding one of said first and second input terminals of said converter, said first switch being in a normally closed state so as to create a conductive path between said respective output and input terminals; means for electrically coupling the other of said first and second output terminals to the other of said first and second input terminals: a capacitor connected between said first and second input terminals of said converter; means for detecting when the voltage across said capacitor exceeds a first predetermined value and for causing said first switch to switch to a current limit state in response thereto; and means for maintaining said first switch in said current limit state until the voltage across said capacitor drops below a second predetermined value.

In a preferred embodiment of the present invention, the current coupled through said first switch is controlled so as not to exceed a predetermined maximum, such that a portion of the overvoltage level output by the rectifier circuit is dropped across said switch.

An object of the present invention is, therefore, to provide a power converter that is protected from high transient input voltages.

Another object of the present invention is to provide a transient voltage protection circuit that enables the periodic transfer of a controlled amount of energy from a rectifier circuit to a capacitor during the time a DC overvoltage is being output by the o rectifier circuit, whereby the energy stored in the capacitor is used by the DC-to-DC converter to enable continuous operation of the converter until the overvoltage condition subsides.

A further object of the present invention is to provide a switch that normally operates in a saturated condition with a small amount of quiescent power loss and which acts to periodically enter a current limit mode and then close to thereby meter the amount of energy coupled to the capacitor and DC-to-DC converter when an overvoltage condition exists, while preventing excessive voltage from being coupled either across the switch or into the converter.

Still another object of the present invention is to enable the transient voltage rating of the power converter to be increased without exceeding the operational limits of the converter and switch and without any significant reduction in the power converter's quiescent efficiency.

These and other objects of the present invention will become apparent to those skilled in the art from the following detailed description of the invention and preferred embodiments, the accompanying drawings, and the appended claims.

BRIEF DESCRIPTION OF THE DRAWINGS

FIG. 1 is a block diagram of a preferred embodiment of an electrical power converter according to the present invention including a transient voltage protection circuit between the rectifier circuit and the DC-to-DC converter;

FIG. 2 illustrates timing diagrams showing the operation of the converter shown in FIG. 1 during the occurrence of an overvoltage condition.

FIG. 3 is a more detailed schematic diagram of a transient voltage protection circuit according to the present invention shown in FIG. 1.

DETAILED DESCRIPTION OF THE PREFERRED EMBODIMENTS

An electrical power converter according to the present invention is shown at 10 in FIG. 1. Power converter 10 includes a rectifier means 12 for rectifying an AC line voltage and for outputting an unregulated voltage $V_{UNR}$. The AC line voltage is input to rectifier means 12 on terminals 14 and 16. The output unregulated DC voltage $V_{UNR}$ appears at terminals 18 and 20. The voltage of the AC line will vary according to local standards from anywhere between 85 $V_{RMS}$ to 240 $V_{RMS}$. In prior art power converters, the output of such a rectifier means 12 is coupled directly to a conventional DC-to-DC converter 40 for converting the unregulated DC output of rectifier 12 into one or more regulated output DC voltages, as needed. According to the present invention, a transient voltage protection circuit 30 is connected between the output terminals 18 and 20 of rectifier means 12 and the input terminals 32 and 34 of DC-to-DC converter 40. As seen in FIG. 1, the output of converter 40 is a regulated DC voltage $V_O$ which is shown coupled to an exemplary variable load 42.

Although a conventional rectifier circuit may be used for rectifier means 12, it is contemplated according to the present invention that a PFC circuit may also be used for providing the unregulated DC $V_{UNR}$ appearing across terminals 18 and 20.

Transient voltage protection circuit 30 includes a current detect means 50 and a switch and current limit means 52 connected in series between the output terminal 20 of rectifier means 12 and the input terminal 34 of converter 40. Switch 52 is configured so as to normally be in a closed state. This creates a conductive path between output terminal 20 of rectifier means 12 and input terminal 34 of converter 40. Current limit means 52 causes the switch to limit the amount of current in this path to a predetermined maximum, irrespective of current demand in the converter 40 or in capacitor 54, as described in greater detail below. A key element of circuit 30 is capacitor 54 which is connected across input terminals 32 and 34 of converter 40. An overvoltage detect and hysteresis means 56 detects when the voltage across capacitor 54 exceeds a first predetermined value and, in response thereto creates an inhibit signal (INH) which causes switch 52 to switch to a current limit state. In this state, a voltage of sufficient size exists across switch 52 so as to limit the amount of overvoltage coupled to converter 40 while maintaining the voltage across switch 52 below this component's rated maximum. The hysteresis operation of the overvoltage detect and hysteresis means 56, described in detail below, operates to maintain the existence of the inhibit signal until the voltage across capacitor 54 drops below a second predetermined value. Once the inhibit signal is removed from switch 52, switch 52 is enabled to return to its normally closed state.

A second capacitor 58 is connected across output terminals 18 and 20 of rectifier means 12. Capacitor 58 functions to absorb any short duration transients that may be generated by the AC line and coupled to the transient voltage protection circuit 30.

Note also that the transient voltage protection circuit 30 will also protect against surges when the system is first plugged into the AC line voltage. The combination of the current detect means 50 and switch 52 along with the overvoltage detect and hysteresis means 56 prevents high current and/or voltage from being coupled into DC-to-DC converter 40 at such a time. This is also identified in the art as being a soft-start current limit means. Note also that the transient voltage protection circuit 30 will enable ongoing operation of converter 40 during a brownout condition when the input unregulated voltage $V_{UNR}$ falls below the minimum voltage required by DC-to-DC converter 40. Although switch 52 remains closed, the energy stored on capacitor 54 provides short term higher levels of DC voltage energy to DC-to-DC converter 40. In other words, for short duration brownout conditions, capacitor 54 contains sufficient energy so as to provide temporary maintenance of a higher voltage on the input terminals 32 and 34 of DC-to-DC converter 40, thereby preventing such short term brownout conditions from effecting the operation of DC-to-DC converter 40.

Operation of the transient voltage protection circuit 30 according to the present invention is best understood with reference to the timing diagrams shown in FIG. 2. As shown in FIG. 2, when an AC overvoltage condition occurs at input terminals 14 and 16 of rectifier means 12, e.g. an input overvoltage of 317 $V_{RMS}$, the output voltage $V_{UNR}$, shown at 100, rises from a normal 350 VDC level to an overvoltage DC level of 450 VDC. Typical durations for such potentially damaging overvoltage conditions can range up to 30 milliseconds or more before the voltage drops back to the expected 350 VDC range. The present invention operates to limit the voltage appearing at the input terminals 32 and 34 of DC-to-DC converter 40 during this overvoltage condition interval. A timing diagram which illustrates the voltage variation of $V_{IN}$, the voltage coupled to converter 40, is shown at 110 in FIG. 2. As seen, when $V_{UNR}$ passes through a predetermined voltage detection level, $V_{DET}$, the overvoltage detect means 56 detects this condition and causes the inhibit signal INH to be generated. The INH signal causes switch 52 to enter a current limit state, thereby preventing the voltage $V_{IN}$ from exceeding a predetermined maximum at input terminals 32 and 34.

More specifically, in the time prior to the partial opening of switch 52, as can be seen in diagram 110, capacitor 54 is charged up to a higher voltage than normal, e.g., 380 volts, as a result of the rise in voltage of $V_{UNR}$. Once switch 52 enters a current limit state as a function of the inhibit signal, a significant portion of the overvoltage is dropped across switch 52. Capacitor 54 thus functions to couple energy to the DC-to-DC converter 40, thereby enabling DC-to-DC converter 40 to continue to provide output voltage $V_O$ notwithstanding the fact that a portion of $V_{UNR}$ is dropped across switch 52. As seen in 110, as the energy stored in capacitor 54 is coupled to DC-to-DC converter 40, the voltage across capacitor 54 begins to drop. The overvoltage detect and hysteresis means 56 includes a hysteresis circuit which detects when this voltage drop across capacitor 54 goes below a predetermined lower voltage level. At this point, the inhibit signal is removed by hysteresis means 56 and switch 52 is allowed to close and fully conduct, thereby again enabling the voltage $V_{UNR}$ to be coupled through switch 52 to capacitor 54 and input terminals 32 and 34. Current limit means 50 ensures that no excessive current is coupled during this time to capacitor 54 and DC-to-DC converter 40, thereby preventing any catastrophic damage to any of the components.

At a fixed later time, depending on the amount of current that is allowed to bleed through current limit means 50, the voltage across capacitor 54 again charges up to a point that the overvoltage detect and hysteresis means 56 detects the predetermined overvoltage level and regenerates the inhibit signal. This again causes switch 52 to enter a current limit state, and the above process is repeated. This periodic cycling of switch 52 and charging and discharging of capacitor 54 continues as long as the overvoltage condition also continues to exist. Once voltage $V_{UNR}$ drops below the predetermined overvoltage level after the overvoltage condition has subsided, switch 52 is enabled to be maintained in its closed state, thereby providing normal coupling of the unregulated voltage $V_{UNR}$ to the input terminals 32 and 34 of DC-to-DC converter 40.

A more detailed schematic diagram of the transient voltage protection circuit 30 according to the present invention is shown in FIG. 3. Where possible, the same numbers as used in FIG. 1 for various components are also used in FIG. 3.

As seen in FIG. 3, switch 52 is a conventional MOSFET whose source and drain are coupled in series between output terminal 20 of rectifier means 12 and input terminal 34 of DC-to-DC converter 40. MOSFET 52 is chosen to have adequate transient power rating and normally will operate in a fully conducting saturated condition with a small amount of quiescent power loss resulting thereby. Transistor switch 52 is normally maintained in a closed conductive state by means of series connected resistors 200 and 202 and zener diode 204. When a voltage $V_{UNR}$ is applied to terminals 18 and 20, resistors 200 and 202 and zener diode 204 act to create a voltage on a node 206 of sufficient amplitude to maintain switch 52 is a conductive state during normal operation.

The current limit means portion of switch 52 is designed to limit the amount of current coupled through switch 52 from terminal 20 to capacitor 54 and converter 40. Current limit 50 includes a transistor 208 whose collector is connected to node 206, the gate of transistor 52, and whose emitter is coupled through a resistor 210 to terminal 20 of rectifier means 12. The base of transistor 208 is coupled to node 212 via a resistor 214. A capacitor 218 is also connected between the base of transistor 208 and terminal 20. A current detect resistor 216 comprises current detect means 50, and is connected in series between terminal 20 of rectifier means 12 and transistor 52. The current through resistor 216 is made up of the charging current for capacitor 54 and the DC current required by DC-to-DC converter 40.

In operation, the output from the collector of transistor 208 will control the gate to source voltage of transistor 52 and therefore limit the current passing through transistor 52 as a function of the current detected by resistor 216, which is in the form of a voltage drop detected by transistor 208. Resistor 214 and capacitor 218 act as a filter to remove the high frequency noise generated by the system.

The overvoltage detect and hysteresis means 56 includes a voltage sensing chain comprising resistors 230, 232 and 234 which provides a voltage input to a comparator 236 whose other input is coupled to a 2.5 V reference. The output of comparator 236 feeds a second switch comprising a transistor 238. The function of comparator 236, the 2.5 V reference and transistor 238 is preferably provided by a standard TL431 shunt regulator that is well known in the art and commercially available.

In operation, when the voltage coupled to the input of comparator 236 by the voltage sensing chain comprising resistors 230, 232 and 234 exceeds the 2.5 V reference, sufficient current is generated by comparator 236 to switch transistor 238 on, which enables current to be coupled through an optical coupling diode 240 connected in series between an auxiliary voltage source, transistor 238 and terminal 34 of DC-to-DC converter 40. The input voltage to comparator 236 causes comparator 236 to turn transistor 238 on when the voltage across terminals 32 and 34 exceeds a predetermined level, e.g. 380 V.

The optical coupling diode 240 is optically coupled to a corresponding transistor 242 connected between the source and gate of transistor 52. According to the present invention, when current is conducted through diode 240, this causes transistor 242 to also be conductive and to remove the gate drive voltage from transistor 52. This causes transistor 52 to enter a current limit state for as long as the current flows through optical diode 240, and thus comprises the inhibit signal described above which is generated when an overvoltage condition exists.

The hysteresis function of the overvoltage detect and hysteresis means 56 is provided by transistor 250. When switch 238 turns on, this turns on transistor 250 via transistor 252 which thereby supplies current through resistor 254 to change the bias point of node 256 at the input to comparator 236. This results in the voltage needed to turn off comparator 236 to be lower. Consequently, the voltage across capacitor 54 must drop below this lower voltage value, e.g. 350 V, before comparator 236 will turn off thereby allowing the normal drive voltage for switch 52 to be resumed.

The period for the recharging of capacitor 54 is determined from the maximum current through switch 52, the value of capacitor 54 and the current into the DC-to-DC converter. Thus, if the value of capacitor 54 is 330 microfarads, the difference between the maximum voltage and the hysteresis switch voltage is 380 minus 350 or 30 V and the current into the capacitor is 5 amps versus 1 amp for the DC-to-DC converter out of the total of 6 amps that is coupled through switch 52, this results in a figure of 2 milliseconds for the charge time of capacitor 54. The discharge time for capacitor 54 will be around 10 milliseconds with the same load conditions for the DC-to-DC converter 40.

While the invention has been described in connection with the illustrated embodiments, the present invention is not limited to the disclosed embodiments. The present invention encompasses modifications and equivalent arrangements within the scope of the appended claims.

What is claimed is:

1. In an electrical power converter having a rectifier means for converting an input AC voltage to an unregulated DC intermediate voltage, said intermediate voltage appearing on first and second output terminals of said rectifier means, and a DC-to-DC converter for converting said unregulated DC intermediate voltage into one or more regulated output DC voltages, including first and second input terminals, a transient overvoltage protection circuit comprising:

a first switch connected in series between one of said first and second output terminals of said rectifier means and a corresponding one of said first and second input terminals of said converter, said first switch being in a normally closed state so as to create a conductive path between said respective output and input terminals;

means for electrically coupling the other of said first and second output terminals to the other of said first and second input terminals;

a capacitor connected between said first and second input terminals of said converter;

means for detecting when the voltage across said capacitor exceeds a first predetermined value and for causing said first switch to switch to a current limit state in response thereto, wherein said current limit state comprises the periodic switching of said first switch between a normally closed state and an open state, said first switch being caused to open when the voltage across said capacitor reaches said first predetermined value and to close when the voltage across said capacitor drops to a second predetermined value; and means for maintaining said first switch in said current limit state until the voltage across said capacitor drops below said second predetermined value.

2. The transient voltage protection circuit of claim 1 wherein the rate of said periodic switching is a function of the rate at which said capacitor charges and discharges.

3. The transient voltage protection circuit of claim 1 wherein said means for detecting when the voltage across said capacitor exceeds said first predetermined value comprises a voltage sensing chain including a plurality of resistors connected in parallel across said capacitor, a comparator, and a fixed voltage reference, said comparator detecting when a bias voltage generated by said voltage sensing chain exceeds said voltage reference and for outputting a signal in response thereto, said means for causing said first switch to switch to said current limit state comprising a second switch, said second switch being in a normally open state and being responsive to the output signal of said comparator to switch to a closed state to cause said first switch to switch to said current limit state.

4. The transient voltage protection circuit of claim 3 wherein said means for maintaining said first switch in said current limit state comprises hysteresis means for causing said comparator to reduce the level of bias voltage coupled to said comparator, said comparator acting response thereto to continue to output a signal and maintain said second switch in said closed state until the capacitor voltage drops below said second predetermined value.

5. The transient voltage protection circuit of claim 4 wherein said first switch comprises a first transistor and a phototransistor, said first transistor having a source terminal and a drain terminal coupled between said respective output and input terminals and having a gate terminal for controlling the amount of current passing therebetween, said phototransistor coupled across said gate and source terminals, and further wherein said second switch comprises a second transistor, a photodiode, and an auxiliary voltage source for supplying power to said photodiode, wherein said second transistor generates a ground reference for said photodiode when said second switch closes, which in turn generates photons, said phototransistor being responsive to said photons to cause a short circuit across said gate and source terminals.

6. The transient voltage protection circuit of claim 5 wherein said hysteresis means comprises a third transistor responsive to said second transistor.

7. The transient voltage protection circuit of claim 1 further comprising current detect means for detecting the amount of current being coupled from said rectifier means to said capacitor; and a current limiting circuit for limiting the amount of current conducted by said first switch as a function of the current detected by said current detect means.

8. The transient voltage protection circuit of claim 7 wherein said current detect means comprises a current limit resistor connected in series between said one of said first and second output terminals of said rectifier means and said source terminal of said first switch.

9. The transient voltage protection circuit of claim 8 wherein said current limiting circuit comprises a fourth transistor having a collector coupled to said gate terminal of said first transistor, an emitter terminal coupled to said output terminal through a first resistor, and a base terminal coupled to said source terminal of said first transistor through a second resistor, wherein the output of said collector of said fourth transistor controls the voltage across said gate and source terminals of said first transistor as a function of the voltage appearing across said current limit resistor, thereby limiting the amount of current passing through said first transistor.

10. The transient voltage protection circuit of claim 1 further comprising a second capacitor connected across said first and second output terminals of said rectifier means for absorbing transient voltage surges generated by said rectifier means.

11. In an electrical power converter having a rectifier means for converting an input AC voltage to a DC intermediate voltage, said intermediate voltage appearing on first and second output terminals of said rectifier means, and a DC-to-DC converter for converting said unregulated DC intermediate voltage into one or more regulated output DC voltages, including first and second input terminals, a transient overvoltage protection circuit comprising:

a first switch connected in series between one of said first and second output terminals of said rectifier means and a corresponding one of said first and second input terminals of said converter, said first switch being in a normally closed state so as to create a conductive path between said respective output and input terminals;

means for electrically coupling the other of said first and second output terminals to the other of said first and second input terminals;

a capacitor connected between said first and second input terminals of said converter;

means for detecting when the voltage across said capacitor exceeds a first predetermined value;

a second switch being in a normally opened state and being responsive to said means for detecting, said second switch being caused to close upon the detection of a voltage across said capacitor which exceeds said first predetermined value, the closure of said second switch causing said first switch to switch to a current limit state wherein said first switch opens and closes at a periodic rate wherein said periodic rate is a function of the rate at which said capacitor charges and discharges; and means for maintaining said first switch in said current limit state until the voltage across said capacitor drops below a second predetermined value.

12. The transient voltage protection circuit of claim 11 further comprising current detect means for detecting the amount of current being coupled from said rectifier means to said capacitor; and a current limiting circuit for limiting the amount of current conducted by said first switch when in said current limit state as a function of the current detected by said current detect means.

13. The transient voltage protection circuit of claim 11 further comprising a second capacitor connected across said first and second output terminals of said rectifier means for absorbing transient voltage surges generated by said rectifier means.

14. In an electrical power converter having a rectifier means for converting an input AC voltage to an intermediate DC voltage, said intermediate DC voltage appearing on first and second output terminals of said rectifier means, and a DC-to-DC converter for converting said intermediate DC voltage into one or more regulated output DC voltages, including first and second input terminals, a transient overvoltage protection circuit comprising:

a current limit means connected in series between said first output terminal of said rectifier means and said first input terminal of said converter creating a conductive path between said respective output and input terminals, said current limit means being in a fully conductive state upon normal operation of said electrical power converter;

means for electrically coupling said second output terminal to said second input terminal;

a capacitor connected between said first and second input terminals of said converter; and overvoltage detection means for detecting when the voltage across said capacitor exceeds a maximum voltage level, said current limit means being responsive thereto to switch to a partially conductive state to limit the amount of current in said conductive path to below a maximum current value, said current limit means remaining in said partially conductive state until the voltage across said capacitor returns to a normal voltage level.

15. The transient protection circuit of claim 14 wherein said current limit means periodically switches between a conducting mode and a non-conducting mode when in said partially conductive state wherein the rate at which said current limit means periodically switches is a function of the rate at which said capacitor charges to a first predetermined voltage level and discharges to a second predetermined voltage level.

16. The transient protection circuit of claim 14 further comprising:

current detection means connected in series between said first output terminal of said rectifier means and said current limit means for detecting the amount of current provided by said rectifier, and current control means connected between said current detection means and said current limit means for controlling the amount of current conducted in said conductive path when said current limit means is in said fully conductive state or in said conducting mode of said partially conductive state, wherein the amount of current conducted in said conductive path is a function of the amount of current detected by said current detection means.

17. The transient protection circuit of claim 16 wherein said current detection means comprises a resistor connected in series between said one of said first and second output terminals of said rectifier means and said current limit means.

18. The transient protection circuit of claim 14 further comprising a second capacitor connected between said first and second output terminals of said rectifier for absorbing transient voltage surges generated by said rectifier means.

* * * * *